US008340880B2

(12) United States Patent
Craig et al.

(10) Patent No.: US 8,340,880 B2
(45) Date of Patent: Dec. 25, 2012

(54) SYSTEM AND METHOD FOR AUTOMATICALLY AND INDEPENDENTLY CONTROLLING WHEEL TORQUE OR SPEED USING WHEEL HUBS HAVING ENGAGEMENT/DISENGAGEMENT MECHANISMS INTEGRATED THEREWITH

(75) Inventors: William C. Craig, Endicott, NY (US); Richard S. Stevens, Endicott, NY (US)

(73) Assignee: Lockheed Martin Corporation, Grand Prairie, TX (US)

( * ) Notice: Subject to any disclaimer, the term of this patent is extended or adjusted under 35 U.S.C. 154(b) by 890 days.

(21) Appl. No.: 12/199,035

(22) Filed: Aug. 27, 2008

(65) Prior Publication Data
US 2009/0062999 A1 Mar. 5, 2009

Related U.S. Application Data

(60) Provisional application No. 60/968,396, filed on Aug. 28, 2007.

(51) Int. Cl.
*B60K 17/354* (2006.01)
(52) U.S. Cl. .......... 701/69; 700/89; 180/246; 192/221.1
(58) Field of Classification Search ............ 701/69, 701/89; 180/246; 192/221.1
See application file for complete search history.

(56) References Cited

U.S. PATENT DOCUMENTS

| 3,788,435 | A | | 1/1974 | Prueter |
| 4,195,721 | A | | 4/1980 | Shea |
| 5,036,939 | A | | 8/1991 | Johnson et al. |
| 5,396,421 | A | * | 3/1995 | Niikura et al. ............ 701/69 |
| 5,894,904 | A | * | 4/1999 | Yakou et al. ............ 180/247 |
| 6,090,006 | A | * | 7/2000 | Kingston ............ 475/323 |
| 6,491,126 | B1 | | 12/2002 | Robison et al. |
| 6,817,434 | B1 | * | 11/2004 | Sweet ............ 180/245 |
| 6,962,227 | B1 | | 11/2005 | Kirkwood |
| 7,614,470 | B2 | * | 11/2009 | Peterson et al. ........ 180/197 |
| 2004/0176899 | A1 | * | 9/2004 | Hallowell ............ 701/84 |
| 2006/0213742 | A1 | | 9/2006 | Irikura et al. |

FOREIGN PATENT DOCUMENTS

| DE | 10103726 A1 | 8/2002 |
| JP | 09226408 A | 9/1997 |

* cited by examiner

*Primary Examiner* — Kevin Hurley
(74) *Attorney, Agent, or Firm* — Slater & Matsil, L.L.P.

(57) ABSTRACT

A system and method for controlling torque and/or speed of wheels of a vehicle. The system and method receive one or more vehicle operating signals. Based on the received vehicle operating signals, the system and method determine whether one or more of a vehicle's wheels require torque or speed modification. If it is determined that one or more of the vehicle's wheels requires torque or speed modification, the system and method modifies the torque to drive, or speed of, a wheel or wheels based on the received vehicle operating signals. The modification is automatic and/or independent for each wheel. Some or all wheels can be coupled to respective wheel hubs having incorporated therewith an engagement/disengagement mechanism. The system and method can control the engagement/disengagement mechanism to modify the torque at, or speed of, the associated wheel based on the received vehicle operating signal or signals.

20 Claims, 4 Drawing Sheets

SYSTEM AND METHOD FOR AUTOMATICALLY AND INDEPENDENTLY CONTROLLING WHEEL TORQUE OR SPEED USING WHEEL HUBS HAVING ENGAGEMENT/DISENGAGEMENT MECHANISMS INTEGRATED THEREWITH

CROSS REFERENCE TO RELATED APPLICATION

The present application claims the benefit of U.S. Provisional Patent Application No. 60/968,396 filed Aug. 28, 2007, which is hereby incorporated by reference in its entirety.

BRIEF SUMMARY OF THE INVENTION

The present invention relates generally to a system and method for automatically and/or independently controlling wheel torque and/or wheel speed using wheel hubs. In various embodiments, each wheel hub has an engagement/disengagement mechanism integrated therewith.

DETAILED DESCRIPTION

Figure 1:
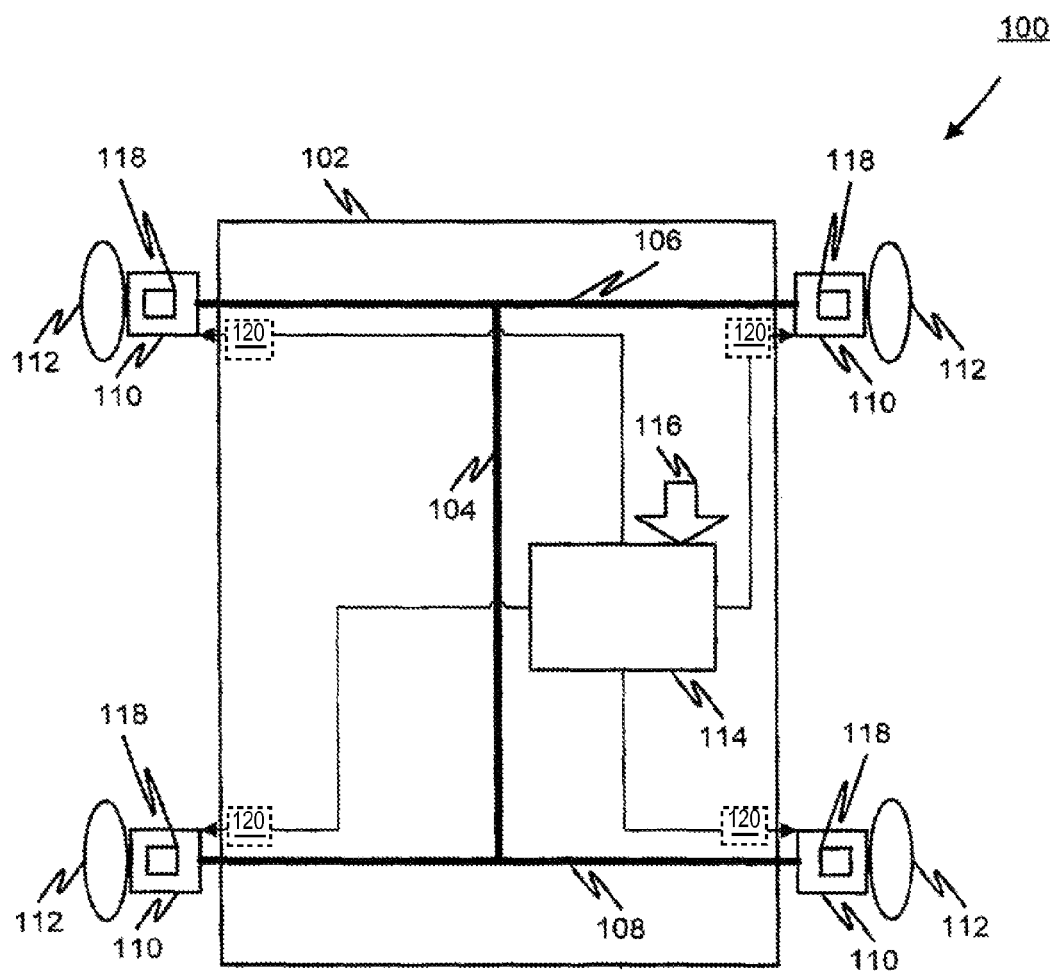
FIG. 1 is a system level block diagram according to various embodiments.

Embodiments are directed generally to a system and method for controlling wheel torque and/or wheel speed of a vehicle. In particular, various embodiments can include (i.e., comprise) a system and method for controlling at least one of a torque to drive and a speed of at least one wheel of a plurality of wheels of a vehicle, wherein some or all of the wheels are coupled to wheel hubs. Some or all of the wheel hubs may have an engagement/disengagement mechanism integrated therewith. In various embodiments, the system and method can include electronically receiving one or more vehicle operating signals and automatically determining, based on the received signals, that fewer than all of the vehicle's wheels require torque and/or speed modification for wheel control of the vehicle. In response to the automatically determining, the system and method may automatically and/or independently modify the torque or wheel speed to drive at least one of the wheels based on the received vehicle operating signals. A controller may output control signals to modify the torque or speed of a wheel or wheels. In various embodiments, the controller may send the control signals to one or more control mechanisms to modify or control the torque or speed of a wheel or wheels. In various embodiments, the wheel hubs can be located at some or all of the wheels, and each of the wheel hubs can be automatically and/or independently controlled to modify the torque to drive its respective wheel or to modify the wheel speed. Further, in various embodiments, each of the wheel hubs may have an engagement/disengagement mechanism incorporated therewith, and the engagement/disengagement mechanism can be automatically and/or independently controlled to modify the torque to drive the respective wheel or to modify the wheel speed. Various embodiments of the present invention may improve torque vectoring and thereby provide better vehicle control; reduce rolling resistance as compared with standard geared hubs, thereby improving a vehicle's efficiency; reduce driveline weight; and improve packaging within a vehicle.

Embodiments of the present invention can also include a system for selectively controlling torque or speed of wheels of a vehicle, wherein the wheels may include four wheels. The system can have means for electronically receiving at least one vehicle operating signal; means for determining, based on the received at least one vehicle operating signal, whether a selected one of the wheels requires torque or speed modification; means for outputting control signals to modify a torque to drive or speed of the selected wheel based on the received at least one vehicle operating signal; and means for selectively controlling the selected wheel to modify the torque to drive or speed of the wheel based on control signals received from the means for outputting control signals. The means for outputting may be configured to output control signals if it is determined that the wheel requires torque modification, and the means for outputting control signals may be configured to independently and automatically control the means for selectively controlling in response to the determination that the wheel requires torque modification.

Various embodiments of the present invention can also include a vehicle. The vehicle can have a main drive shaft which may be coupled at opposite ends to a front axle and to a rear axle; a plurality of wheel hubs, wherein respective ones of the wheel hubs may be coupled to ends of the front axle and to ends of the rear axle; a plurality of wheels, wherein at least two of the wheels may be coupled to respective wheel hubs; a controller that can be configured to receive vehicle operating signals and to determine, based on the received vehicle operating signals, that a plurality of the wheels require independent torque or speed modification. The plurality of wheels determined to require independent torque or speed modification may include a first wheel and a second wheel. The vehicle also can include a first wheel hub controller which may be adjacent to the first wheel, and can be configured to control individually the torque or speed of the first wheel; and a second wheel hub controller which may be adjacent to the second wheel, and can be configured to control individually the torque or speed of the second wheel independently of the first wheel. The controller can be configured to send a control signal to the first wheel hub controller and a different control signal to the second wheel hub controller to control independently and electronically the torque or speed of each of the first and second wheels determined to require torque or speed modification.

FIG. 1 shows a block diagram of a system 100 according to various embodiments incorporated with a vehicle 102. Vehicle 102 may be any suitable vehicle, including, but not limited to cars, trucks, manned vehicles, and unmanned vehicles. Further, vehicle 102 may include any suitable drive train (not shown), including, but not limited to, front wheel drive, rear wheel drive, four-wheel drive, etc. Vehicle 102 may include a main drive shaft 104, a front axle 106, a rear axle 108, wheel hubs 110, wheels 112, and a controller 114. Main drive shaft 104 may be coupled to an engine via a transmission (e.g., automatic or standard) and a transfer case (not shown). Main drive shaft 104 may also be coupled at opposite ends to front axle 106 and rear axle 108 by any suitable means. In various embodiments, a differential can be omitted from the coupling between one of or both of the couplings between the main drive shaft 104 and front axle 106 and main drive shaft 104 and rear axle 108. Further, in various embodiments, differentials can be omitted completely.

Front axle 106 can be coupled to main drive shaft 104 and to wheels 112, via wheel hubs 110. In various embodiments, each end of front axle 106 can be coupled to one wheel 112 via one wheel hub 110. In various embodiments, wheel hub 110 may be omitted and front axle 106 can be connected only to wheels 112. FIG. 1 shows an embodiment with four wheel hubs 110, with one wheel hub 110 provided at each wheel 112. However, embodiments are not limited to providing a wheel hub 110 at each wheel 112, and not all wheels may be provided with wheel hubs 110. Wheel hubs 110 may be coupled to front axle 106 and respective wheels 112 in any suitable manner.

Rear axle 108 can be coupled to main drive shaft 104 and to wheels 112, via wheel hubs 110. In various embodiments, each end of rear axle 108 can be coupled to one wheel 112 via one wheel hub 110. In various embodiments, wheel hub 110 may be omitted and rear axle 108 can be connected only to wheels 112. One or more of the wheel hubs 110 in FIG. 1 may be provided in system 100. As discussed above, FIG. 1 shows an embodiment with four wheel hubs 110, with one wheel hub 110 provided at each wheel 112. However, embodiments are not limited to providing a wheel hub 110 at each wheel 112, and not all wheels 112 may be provided with wheel hubs 110. Wheel hubs 110 may be coupled to rear axle 108 and respective wheels 112 in any suitable manner.

Wheel hubs 110 can be coupled in any suitable manner to each end of front and rear axles 106, 108, respectively, and to respective wheels 112. In various embodiments, wheel hubs 110 may be any suitable wheel hub, including, but not limited to, geared wheel hubs and non-geared wheel hubs which can provide a reduction feature from the respective axles to wheels 112. In various embodiments, the reduction feature can be a gear reduction feature. A non-geared wheel hub can represent a wheel hub having no internal gearing. The wheel hub 110 can further include a spindle for mounting of the wheel. In various embodiments, wheel hubs 110 may be coupled to both front axle 106 and rear axle 108, coupled only to front axle 106, or coupled only to rear axle 108. Further, the determination of the wheels at which wheel hubs 110 are implemented may be based on the type of drive train. For example, if the drive train includes a rear-wheel drive train, wheel hubs 110 may be implemented only at rear axle 108 and rear wheels 112. However, wheel hubs 110 may be implemented at all of the wheels 112 regardless of the type of drive train. Wheel hubs 110 are also electrically coupled to controller 114. In various embodiments, wheel hubs 110 can be controlled by controller 114 to modify the torque at, or speed of, wheels 112 as discussed herein.

In various embodiments, wheel hubs 110 can include an engagement/disengagement mechanism 118. The engagement/disengagement mechanism 118 can be included with the wheel hub 110 as an integrated unit. Engagement/disengagement mechanism 118 may be any suitable engagement/disengagement mechanism, including, but not limited to a clutch or variable ratio device, such as a continuously variable transmission (CVT) or the like. In various embodiments, the clutch can be a progressive engagement clutch or the like. Engagement/disengagement mechanism 118 may be operated in any suitable manner, including, but not limited to, hydraulically, pneumatically, etc. In various embodiments, engagement/disengagement mechanism 118 may, for example, disengage a geared portion of the associated wheel hub 110 so that the corresponding wheel 112 can spin freely or rotate without turning the associated front or rear axles 106, 108 (or axle half shaft). In various embodiments, each wheel 112 can be progressively engaged by engagement/disengagement mechanism 118 and allowed to spin at a speed different than other wheels 112. Moreover, in various embodiments, each wheel 112 may be either engaged by engagement/disengagement mechanism 118 and driven by its associated axle 106, 108, or be partially driven, or fully freewheel (e.g., engagement/disengagement mechanism 118 fully disengaged), depending on the need for torque or wheel speed at each wheel 112. For example, control of engagement/disengagement mechanisms 118 may allow for differential wheel speed and for selectively driving wheels 112 respectively associated therewith.

Vehicle 102 can include any suitable type of wheels 112 and any suitable number of wheels 112, such as, but not limited to, two, three, four, six, etc. In various embodiments, and as shown in FIG. 1, vehicle 102 can have four wheels 112. As discussed above, in various embodiments, wheels 112 may be coupled to front and rear axles 106, 108. Further, in various embodiments, wheels 112 may be coupled to front and rear axles 106, 108 via wheel hubs 110.

Controller 114 may be located at any suitable position in or on vehicle 102. Controller 114 can be any suitable controller, including, but not limited to, a microcomputer, a microprocessor, a microcontroller, a computing device, a circuit board or boards using electronic components, etc. Controller 114 can be configured to operate in accordance with a sequence of programmed instructions to cause torque or speed control operations to be performed as discussed herein. The controller 114 can further include a memory in which the programmed instructions are encoded or stored. In various embodiments, controller 114 can be coupled to each wheel hub 110. Controller 114 can also receive one or more vehicle operating signals 116. The one or more vehicle operating signals 116 can be received from any suitable vehicle operating system and sent by any suitable means. Vehicle operating systems can include, but are not limited to, shaft systems, engine systems, including a throttle system, wheel measuring systems, steering systems, vehicle dynamic systems, etc. In various embodiments, vehicle operating signals can include, but are not limited to, a half-shaft speed signal, a throttle position signal, a wheel speed signal, a steering angle signal, an engine speed signal, a transmission signal, a pitch signal, a roll signal, and a yaw signal. In various embodiments, controller 114 can be configured to determine, based on the one or more vehicle operating signals 116, whether torque at one or more vehicle wheels 112 requires modification or whether wheel speed requires modification. In various embodiments, controller 114 may make this determination using any suitable means and/or methods, including, but not limited to, a lookup table, a database, torque vector calculations, etc. If controller 114 determines that torque at, or speed of, one or more wheels 112 requires modification, controller 114 may control wheel hubs 110 to modify the torque applied at the requisite wheel or wheels 112 based on the one or more vehicle operating signals 116. In various embodiments, controller 114 may automatically and/or independently control wheel hubs 110 to modify the torque applied at the requisite wheel or wheels 112 based on the one or more vehicle operating signals 116. Controller 114 may also control wheel hubs 110 to modify the wheel speed based on the one or more vehicle operating signals 116. In various embodiments, controller 114 may also control wheel hubs 110 to modify the wheel speed based on the one or more vehicle operating signals 116.

In various embodiments, controller 114 may control the determined wheel hub or hubs 110 by sending signals to control mechanisms (e.g., wheel hub controllers 120 alone or in cooperation with the engagement/disengagement mechanisms 118 or other mechanisms) associated with each wheel hub 110. The wheel hub controllers 120 are illustrated with dashed lines to demonstrate that the controller 114 may control the determined wheel hubs 110 directly or in cooperation with the respective wheel hub controllers 120. Also, while the wheel hub controllers 120 are illustrated between the controller 114 and the engagement/disengagement mechanisms 118, it should be understood that the wheel hub controllers 120 may be integrated in the respective wheel hubs 110 with or in lieu of the engagement/disengagement mechanisms 118. In various embodiments, controller 114 may automatically and/or independently control the determined wheel hub or hubs 110 by sending signals to control mechanisms associated with each wheel hub 110, The signals can be digital, analog, or a combination thereof. Each control mechanism can, for example, based on the signal or signals received from controller 114, progressively engage or disengage, completely engage, or completely disengage wheel hub 110. As but one example, the control mechanisms can be means to control pressurized hydraulic fluid in the wheel hubs 110 to engage or disengage wheel hubs 110 in the manner discussed above. As another non-limiting example, control mechanisms can also be servos which engage or disengage wheel hubs 110 in the manner as discussed above. According to various embodiments, controller 114 can control the determined wheel hub 110 so that the geared portion (not shown in FIG. 1) of wheel hub 110 allows wheel 112 to spin freely without turning axle/half shaft. Moreover, controller 114 can control wheel hubs 110 so that each wheel 112 can be progressively engaged and allowed to spin at a different speed than other wheels. In various embodiments, for example, controller 114 can control wheel hubs 110 so as to allow each wheel 112 to either be engaged by engagement/disengagement mechanism 118 and driven by its associated axle 106, 108, or be partially driven, or fully freewheel, depending on the need for torque to be applied at each wheel 112. In various embodiments, the degree of engagement by engagement/disengagement mechanism 118 can be based on one or more of the vehicle operating signals 116 received by controller 114.

Figure 2:
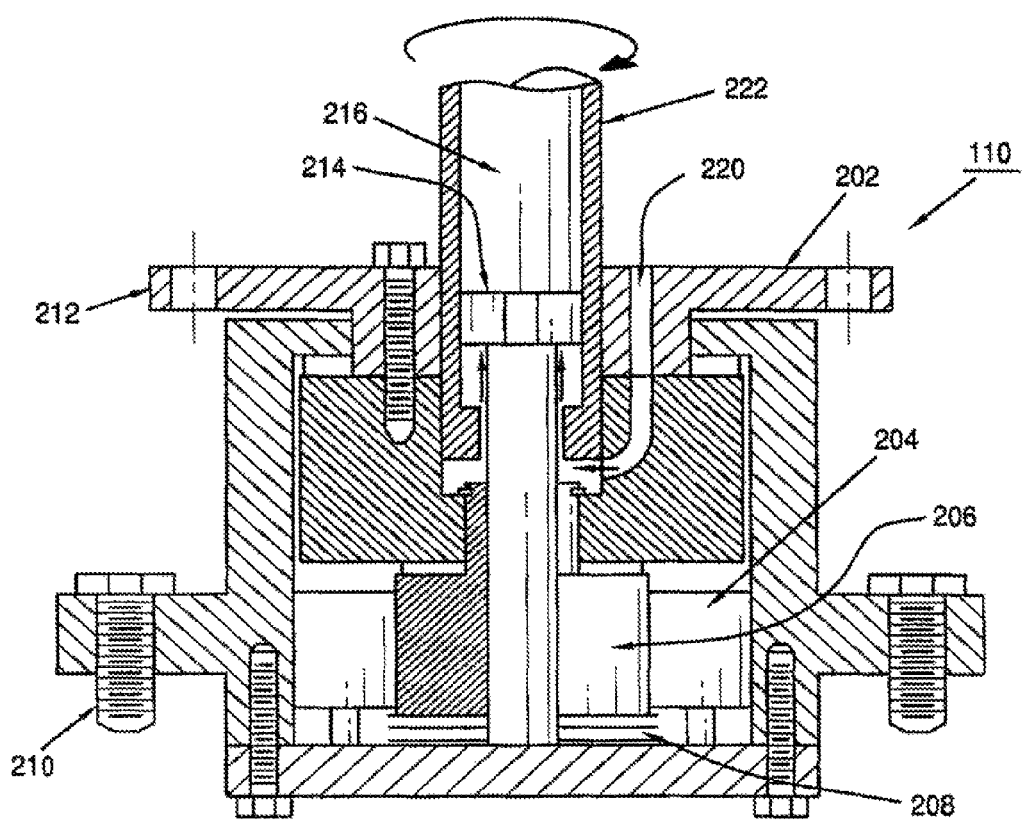
FIG. 2 is a representation of a wheel hub having incorporated therewith an engagement clutch according to various embodiments.

FIG. 2 shows a representation of wheel hub 110 in which pressurized hydraulic fluid can be used to engage or disengage a progressive clutch according to at least one embodiment. In various embodiments, wheel hub 110 can be coupled to an axle shaft or shaft 222, which may represent front axle 106 and/or rear axle 108. Wheel hub 110 can include a housing 202, a planetary gear 204, a sun gear 206, a clutch 208, wheel lugs 210, a hub flange 212, a piston 214, and a channel 220 by which hydraulic fluid is introduced to control piston 214. In various embodiments, piston 214 can be a splined piston. Wheel hub 110 can be coupled to axle shaft 222, which can include a cylinder 216. In various embodiments, cylinder 216 may be a splined cylinder.

In operation, controller 114 can control the pressure of the hydraulic fluid that is introduced into wheel hub 110 via channel 220 using a control mechanism (see, e.g., wheel hub controllers 120 of FIG. 1 alone or in cooperation with the engagement/disengagement mechanisms 118 or other mechanisms), such as, but not limited to, a pump. In various embodiments, controller 114 can control the pressure of hydraulic fluid to fully engage, partially engage, or completely disengage axle 222 from gears 204, 206. For example, controller 114 can increase the pressure of the hydraulic fluid to force piston 214 through cylinder 216 away from clutch 208. Forcing piston 214 away from clutch 208 can activate clutch 208, whereby gears 204, 206 are disengaged or partially disengaged from axle 222. Conversely, for example, controller 114 can decrease or maintain the pressure of the hydraulic fluid to either move or maintain piston 214 in a position in which clutch 208 is not activated. In various embodiments, a non-activated state of clutch 208 can mean that gears 204, 206 are engaged with axle 222.

Figure 3:
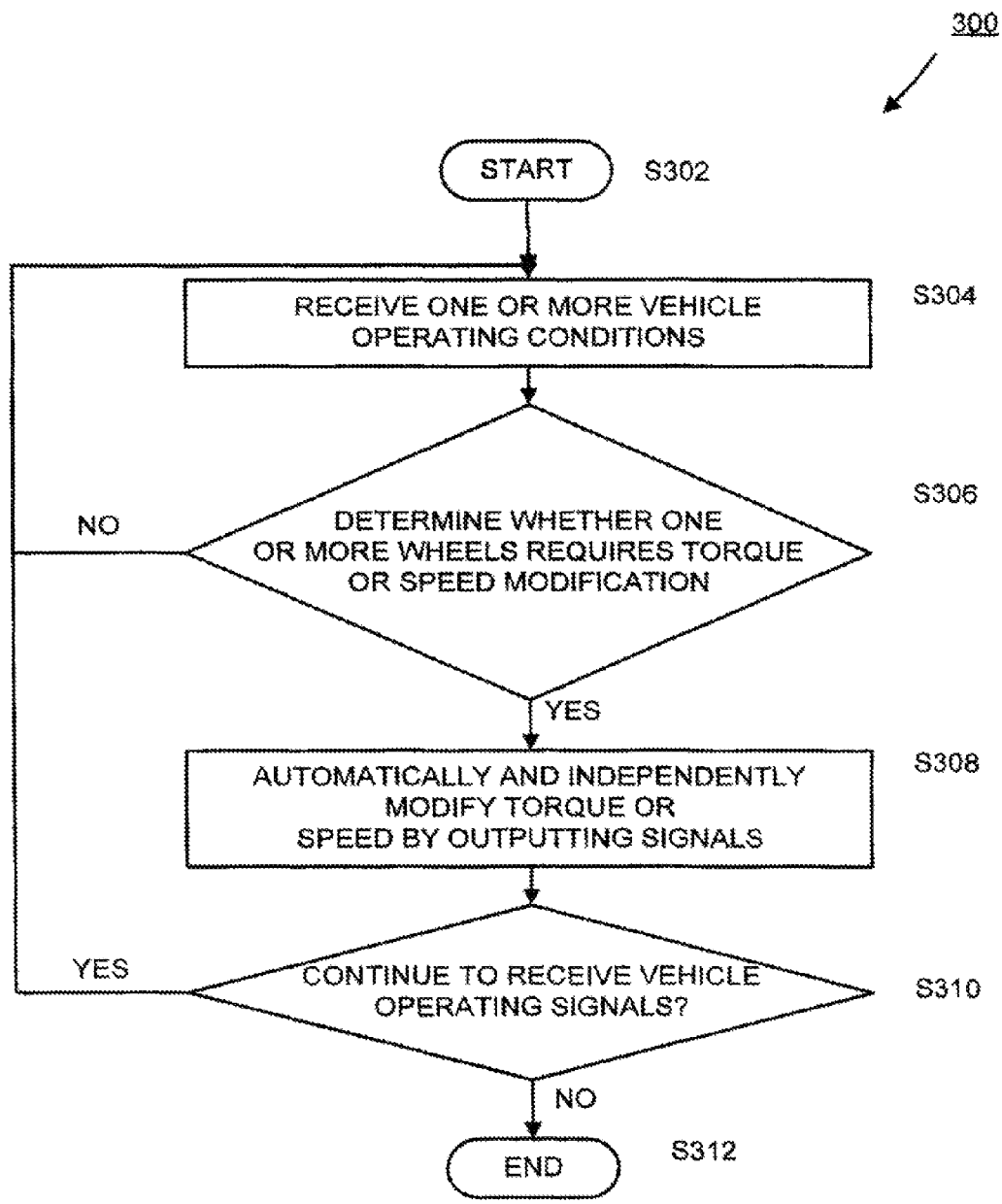
FIG. 3 is a flow chart of a method for controlling wheel torque and/or wheel speed of a vehicle according to various embodiments.

FIG. 3 shows a flow chart of a method 300 for controlling wheel torque and/or wheel speed of a vehicle according to various embodiments. Control may start at S302 and proceed to S304 where one or more vehicle operating signals 116 received. In various embodiments, controller 114 may receive the one or more vehicle operating signals 116. As discussed above, the one or more vehicle operating signals 116 can be received from a vehicle operating system using any suitable means. Vehicle operating systems can include, but are not limited to, shaft systems, engine systems, including a throttle system, wheel measuring systems, steering systems, vehicle dynamic systems, etc. In various embodiments, vehicle operating signals can include, but are not limited to, a half-shaft speed signal, a throttle position signal, a wheel speed signal, a steering angle signal, an engine speed signal, a transmission signal, a pitch signal, a roll signal, and a yaw signal. Control may then proceed to S306, where the method includes determining, based on the received one or more vehicle operating signals 116, whether one or more of the vehicle's wheels 112 requires torque modification and/or speed modification. In various embodiments, controller 114 may make this determination using any suitable means and/or methods, including, but not limited to, a lookup table, a database, torque vector calculations, etc. If it is determined that one or more of the vehicle's wheels 112 requires torque modification or that one or more of the vehicle's wheels 112 requires speed modification, control may proceed to S308. However, if it is determined that one or more of the vehicle's wheels 112 does not require torque or speed modification, control may return to S304, where the method continues to receive one or more vehicle operating signals 116. At S308, the method may modify the torque to drive the at least one or more wheels 112 based on the one or more vehicle operating signals 116. In various embodiments, the modification may be automatically and/or independently for each wheel 112. At S308, the method may also modify the wheel speed of one or more wheels 112 based on the one or more vehicle operating signals 116. In various embodiments, the modification may be automatically and/or independently for each wheel 112. Moreover, in various embodiments, controller 114 may automatically and/or independently control a wheel hub 110 associated with the wheel 112 so as to modify either the torque at that wheel 112 or wheel speed of that wheel 112 based on the one or more vehicle operating signals 116. In various embodiments, the controlled wheel hub or hubs can be associated with the wheel or wheels whose torque or speed is to be modified. Alternatively, or in addition, the controlled wheel hub or hubs can be independent of the wheel or wheels whose torque or speed is to be modified. As an example of a means by which torque or speed modification is achieved, if a wheel hub 110 includes engagement/disengagement mechanism 118 in the form of a clutch, controller 114 may control the clutch so as to either engage, partially engage, or completely disengage the associated wheel, depending on the need for torque at, or speed of, each wheel 112. In various embodiments, the control can be automatically and/or independently for each wheel 112. Control may then proceed to S310, where it is determined whether control is to return to S304 to continue receiving one or more vehicle operating signals 116 or to S312 where the method ends. In various embodiments, S310 may be determined based on whether the vehicle is in a "off" state, such as, but not limited to, when an ignition key is removed from vehicle 102.

Figure 4:
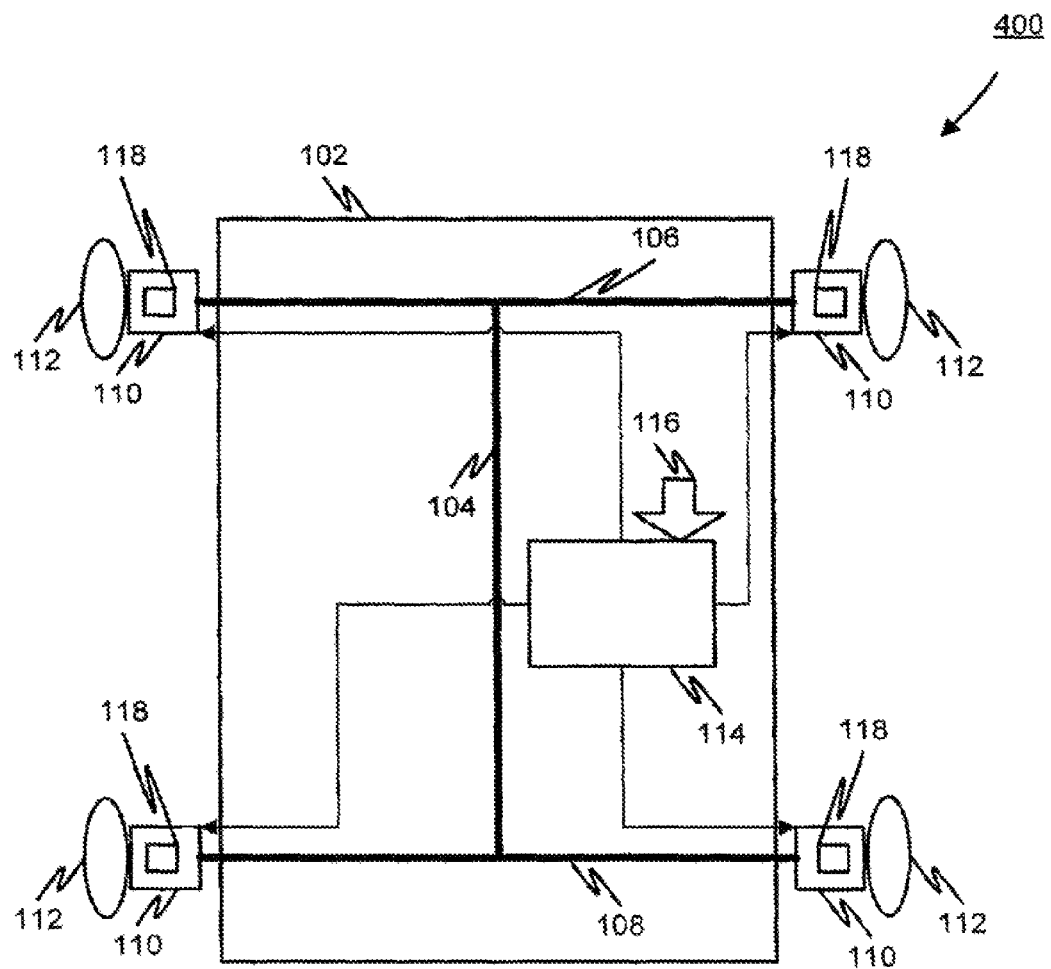
FIG. 4 is a system level block diagram according to various embodiments.

FIG. 4 shows a block diagram of a system 400 according to various embodiments incorporated with vehicle 102. System 400 is substantially the same as described above for system 100, with the exception of item 118. In FIG. 4, item 118 can represent a variable ratio device and a non-progressive engagement clutch. In various embodiments, the variable ratio device can be, but is not limited to, a continuously variable transmission (CVT). Controller 114 can also receive one or more vehicle operating signals 116. The one or more vehicle operating signals 116 can be received from a vehicle operating system using any suitable means. In various embodiments, controller 114 can be configured to determine, based on the one or more vehicle operating signals 116, whether torque at one or more vehicle wheels 112 requires modification. Controller 114 can also be configured to determine, based on the one or more vehicle operating signals 116, whether wheel speed at one or more vehicle wheels 112 requires modification. If controller 114 determines that either torque at one or more wheels 112 or wheel speed of one or more wheels 112 require modification, controller 114 may control variable ratio device to respectively modify either the torque applied at the requisite wheel or wheels 112 or the wheel speed of the requisite wheel or wheels 112, based on the one or more vehicle operating signals 116. In various embodiments, the control can be automatically and/or independently for each wheel 112. For example, variable ratio device can be controlled to engage or partially engage wheel 112. Additionally, controller 114 can control non-progressive engagement clutch to allow wheel 112 to be completely disengaged or to "freewheel." In various embodiments, the control can be automatically and/or independently for each wheel 112.

Thus has been disclosed a system and method for controlling wheel torque and/or wheel speed of a vehicle. In particular, various embodiments can comprise a system and method for controlling torque applied to wheels of a vehicle and/or wheel speed of wheels of the vehicle, wherein some or all of the wheels are coupled to wheel hubs. Further, in various embodiments, each of the wheel hubs has an engagement/disengagement mechanism integrated therewith. The system and method can automatically and/or independently control either the wheel hubs (or the respective engagement/disengagement mechanism if integrated in the wheel hubs), to modify either the torque applied to the associated wheels of the vehicle or the wheel speed, based on received vehicle operating signal or signals.

While the present invention has been described in conjunction with a number of embodiments, the invention is not to be limited to the description of the embodiments contained herein, but rather is defined by the claims appended hereto and their equivalents. It is further evident that many alternatives, modifications and variations would be or are apparent to those of ordinary skill in the applicable arts. Accordingly, all such alternatives, modifications, equivalents, and variations that are within the spirit and scope of this invention.

What is claimed is:

1. A vehicle, comprising:
a main drive shaft coupled at opposite ends to a front axle and to a rear axle;
a plurality of wheel hubs, respective ones of said wheel hubs being coupled to ends of said front axle and to ends of said rear axle;
a plurality of wheels, at least two of said wheels being coupled to respective wheel hubs;
a controller configured to receive vehicle operating signals and to determine, based on said vehicle operating signals that a plurality of said wheels require independent torque or speed modification, said plurality of said wheels including a first wheel and a second wheel;
a first wheel hub controller adjacent to said first wheel, said first wheel hub controller configured to control individually said torque or speed of said first wheel; and
a second wheel hub controller adjacent to said second wheel, said second wheel hub controller configured to control individually said torque or speed of said second wheel independently of said first wheel,
wherein said controller is configured to send a control signal to said first wheel hub controller and a different control signal to said second wheel hub controller to control independently and electronically said torque or speed of each of said first and second wheels determined to require torque or speed modification.

2. The vehicle according to claim 1,
wherein each of said wheel hubs includes an engagement/disengagement mechanism integrated therewith,
wherein said engagement/disengagement mechanism is individually controlled to modify said torque or speed to drive an associated wheel, and
wherein respective ones of said wheel hubs associated with wheels whose torque or speed is determined to be modified are individually controlled to modify said torque or said speed of said associated wheel.

3. The vehicle according to claim 2, wherein said engagement/disengagement mechanism is a progressive engagement clutch.

4. The vehicle according to claim 1, wherein said vehicle operating signals are selected from the group consisting of a half-shaft speed signal, a throttle position signal, a wheel speed signal, a steering angle signal, an engine speed signal, a transmission signal, a pitch signal, a roll signal, and a yaw signal.

5. The vehicle according to claim 1, wherein each of said wheel hubs are geared wheel hubs.

6. The vehicle according to claim 1, wherein each of said wheel hubs are non-geared wheel hubs.

7. The vehicle according to claim 1,
wherein each of said wheel hubs includes a variable ratio device integrated therewith,
wherein said variable ratio device is individually controlled to modify said torque or speed to drive an associated wheel, and
wherein respective ones of said wheel hubs associated with wheels whose torque or speed is determined to be modified are individually controlled to modify said torque or said speed of said associated wheel.

8. The vehicle according to claim 1, wherein said controller is configured to determine if said vehicle is in an off state.

9. The vehicle according to claim 1, wherein each of said wheel hubs include a channel configured to direct hydraulic fluid to control a piston.

10. The vehicle according to claim 1, wherein each of said wheel hubs include a channel configured to direct hydraulic fluid to control a piston to activate a clutch to disengage a gear from one of said front axle and said rear axle.

11. A method of operating a vehicle including a main drive shaft coupled at opposite ends to a front axle and to a rear axle with respective ones of wheel hubs coupled to ends of said front axle and to ends of said rear axle, and a plurality of wheels, at least two of said wheels being coupled to respective wheel hubs, comprising:
receiving vehicle operating signals;

determining, based on said vehicle operating signals that a plurality of said wheels require independent torque or speed modification with a controller, said plurality of said wheels including a first wheel and a second wheel;

controlling individually said torque or speed of said first wheel with a first wheel hub controller adjacent to said first wheel; and controlling individually said torque or speed of said second wheel independently of said first wheel with a second wheel hub controller adjacent to said second wheel, wherein said controller is configured to send a control signal to said first wheel hub controller and a different control signal to said second wheel hub controller to control independently and electronically said torque or speed of each of said first and second wheels determined to require torque or speed modification.

12. The method according to claim 11, wherein controlling individually said torque or speed of said first wheel is performed by an engagement/disengagement mechanism integrated with a respective wheel hub.

13. The method according to claim 12, wherein said engagement/disengagement mechanism is a progressive engagement clutch.

14. The method according to claim 11, wherein said vehicle operating signals are selected from the group consisting of a half-shaft speed signal, a throttle position signal, a wheel speed signal, a steering angle signal, an engine speed signal, a transmission signal, a pitch signal, a roll signal, and a yaw signal.

15. The method according to claim 11, wherein each of said wheel hubs are geared wheel hubs.

16. The method according to claim 11, wherein each of said wheel hubs are non-geared wheel hubs.

17. The method according to claim 11, wherein controlling individually said torque or speed of said first wheel is performed by a variable ratio device integrated with a respective wheel hub.

18. The method according to claim 11 further comprising determining if said vehicle is in an off state.

19. The method according to claim 11 further comprising directing hydraulic fluid to control a piston of each of said wheel hubs via a channel thereof.

20. The method according to claim 11 further comprising directing hydraulic fluid to control a piston of each of said wheel hubs via a channel thereof and activating a clutch to disengage a gear from one of said front axle and said rear axle.

* * * * *